United States Patent
Lees et al.

(10) Patent No.: US 6,948,923 B2
(45) Date of Patent: *Sep. 27, 2005

(54) APPARATUS FOR DIRECT INJECTION MOLDED CLOSURE

(75) Inventors: John Lees, Minneapolis, MN (US); Terry Erickson, St. Paul, MN (US); Terry Berglin, Maple Grove, MN (US); Mike Robertson, Roseville, MN (US); Nicholas Cook, Evanston, IL (US); Russell Stacy-Ryan, Chicago, IL (US); Jens Mogard, AKarp (SE)

(73) Assignee: Tetra Laval Holdings & Finance, SA, Pully (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/787,032

(22) Filed: Feb. 24, 2004

(65) Prior Publication Data

US 2004/0166186 A1 Aug. 26, 2004

Related U.S. Application Data

(60) Continuation of application No. 10/124,968, filed on Apr. 18, 2002, now Pat. No. 6,837,697, which is a division of application No. 09/594,247, filed on Jun. 15, 2000, now Pat. No. 6,467,238.

(51) Int. Cl.[7] .............................................. B29C 45/73
(52) U.S. Cl. .................... 425/112; 425/116; 425/127; 425/129.1; 425/547; 425/552; 425/559
(58) Field of Search ................. 425/112, 116, 425/127, 129.1, 547, 548, 552, 557–561; 53/457

(56) References Cited

U.S. PATENT DOCUMENTS

| | | | |
|---|---|---|---|
| 3,627,193 A | * 12/1971 | Helms | ......................... 53/457 |
| 4,076,790 A | 2/1978 | Lind | |
| 4,140,451 A | 2/1979 | Herdzina, Jr. et al. | |
| 4,232,622 A | 11/1980 | Weierman et al. | |
| 4,269,579 A | 5/1981 | Thomas | |
| 4,525,318 A | 6/1985 | Reil et al. | |
| 4,725,213 A | 2/1988 | Reil et al. | |
| 4,781,012 A | 11/1988 | Reil et al. | |
| 4,818,459 A | 4/1989 | Reil | |

(Continued)

FOREIGN PATENT DOCUMENTS

| | | |
|---|---|---|
| WO | WO 97/11829 | 3/1997 |
| WO | WO 98/18608 | 7/1998 |
| WO | WO 98/18609 | 7/1998 |
| WO | WO 98/18684 | 7/1998 |

*Primary Examiner*—Tim Heitbrink
(74) *Attorney, Agent, or Firm*—Welsh & Katz, Ltd.

(57) ABSTRACT

A form, fill and seal packaging machine for forming, filling and sealing a carton, molds a closure directly onto the carton. The machine includes a carton erection station adapted to receive a carton in a generally flat form and to erect the flat form carton into a tubular form defining an internal carton region. A direct injection molding station has an internal mold tool and an external mold tool. The internal mold tool is configured for receipt within the internal carton region and the internal mold tool and the external mold tool are configured to receive and clamp the carton therebetween. The direct injection molding station further includes a polymer injection system for injecting polymer from a location external of the carton to the internal mold tool. The closure is directly molded in place on the carton. A mold tool set, a method for carrying out the molding and a closure molded thereby are also disclosed.

7 Claims, 9 Drawing Sheets

U.S. PATENT DOCUMENTS

| | | |
|---|---|---|
| 4,844,327 A | 7/1989 | Pausing |
| 4,983,346 A | 1/1991 | Curliss et al. |
| 5,004,411 A | 4/1991 | Reil |
| 5,028,225 A | 7/1991 | Staheli |
| 5,037,290 A | 8/1991 | Curliss et al. |
| 5,052,994 A | 10/1991 | Aeschlilmann |
| 5,059,108 A | 10/1991 | Reil |
| 5,132,071 A | 7/1992 | Sorensen |
| 5,423,670 A | 6/1995 | Hamel |
| 5,498,149 A | 3/1996 | Bengtsson |
| 5,498,225 A | 3/1996 | Nedstedt |
| 5,667,745 A | 9/1997 | Andersson |
| 5,820,807 A | 10/1998 | Urmston |
| 5,897,823 A | 4/1999 | Davis et al. |
| 5,971,742 A | 10/1999 | McCollum et al. |
| 6,012,267 A | 1/2000 | Katsumata |
| 6,109,909 A | 8/2000 | Morita |
| 6,322,350 B1 | 11/2001 | Voets et al. |

\* cited by examiner

APPARATUS FOR DIRECT INJECTION MOLDED CLOSURE

CROSS-REFERENCE TO RELATED APPLICATION DATA

This application is a continuation of U.S. patent application Ser. No. 10/124,968, filed Apr. 18, 2002 now U.S. Pat. No. 6,837,697, which is a divisional application of U.S. patent application Ser. No. 09/594,247, filed Jun. 15, 2000, now U.S. Pat. No. 6,467,238.

FIELD OF THE INVENTION

This invention pertains to molded closures for containers. More particularly, this invention pertains to directly injection molding a closure onto a container.

BACKGROUND OF THE INVENTION

Consumers have come to recognize and appreciate resealable closures for containers to store, for example, liquid food products and the like. These resealable closures permit ready access to the product while providing the ability to reseal the container to prolong the life and freshness of the product. Typically, the containers or cartons are formed from a composite of paperboard material having one or more polymer coatings or layers to establish a liquid impervious structure.

In known containers having such closures, the closures, which are formed in a separate process and transported to the packaging process, are conventionally affixed to the containers as part of the overall form, fill and seal operation. Typically, the closures are affixed to the partially erected carton prior to filling the carton with product. One known method for affixing the closure to the carton uses an ultrasonic welding process. In this process, the carton is partially erected and the closure is brought into contact with the carton, overlying an opening in the carton. Subsequently, an anvil is placed against the carton material and an ultrasonic horn is brought into contact with a flange of the closure. The ultrasonic horn is actuated which ultrasonically welds the flange to the carton material.

Another method for affixing closures to cartons uses an induction heating process. In this process, again, an anvil is placed on the carton material and an induction sealing head is brought into contact with the flange. A current is induced in the induction sealing head which, again, results in welding the flange to the carton.

While these methods for affixing the closures to cartons work well for sealing pre-formed or pre-molded closures to containers, and while they do facilitate maintaining product freshness and container resealability, there are nevertheless drawbacks. For example, closure sourcing could have a significant adverse impact on product manufacture. That is, bottlers or dairies must maintain high inventories of closures to assure that a sufficient quantity is on-hand during the bottling operation, Typically, the closures are provided by a closure manufacturer or supplier. Thus, if the manufacturer or supplier cannot meet the required supply, product production (e.g., packaging) may have to be slowed or stopped until the required volume of closures can be obtained.

In addition, equipment is necessary for transporting and affixing the closures to the cartons. With respect to this equipment, components are necessary to transport the caps from a storage area to the carton and to, perhaps, properly orient the closures at the carton. Additional machine components are also needed to support the closure at the carton and to seal the closure to the carton.

Thus, as will be readily recognized, while such closures provide numerous benefits and advantages over known folded gable top spout arrangements, these closures can be rather costly, and may be too costly for use in lesser expensive products.

Accordingly, there is exists a need for an apparatus and method for providing resealable closures on cartons. Desirably, such an apparatus and method eliminates a packagers reliance on a closure supplier. More desirably, such an apparatus and method allows for eliminating those portions of a form, fill and packaging machine that are related to affixing a closure, such as by welding, to a carton.

SUMMARY OF THE INVENTION

A form, fill and seal packaging machine for forming, filling and sealing a carton molds a closure directly onto the carton. The machine includes a carton erection station that is adapted to receive a carton in a generally flat form and erect the flat form carton into a tubular form defining an internal carton region.

A direct injection molding station has an internal mold tool and an external mold tool. In a preferred embodiment, the internal tool is fixedly mounted and the external tool is configured to move between a first position in which the external tool is disengaged from the internal tool and a second position in which the external tool is engaged with the internal tool with the carton disposed therebetween. In a most preferred embodiment, the external tool is formed having first and second portions configured to move toward one another when the external tool moves to the second position, and away from one another when the external tools moves to the first position.

The internal mold tool is configured for receipt within the internal carton region. The internal mold tool and the external mold tools are configured to receive and clamp the carton therebetween.

The direct injection molding station further includes a polymer injection system for injecting polymer from a location external of the carton to the internal mold tool, thus is directly molding a closure in place on the carton.

The machine further includes a filling station for filling the carton and a sealing station for forming a seal on the carton.

The polymer injection system can be configured to include a charging cylinder and an injection cylinder in series with one another. The charging cylinder provides a feed of polymer to the injection cylinder. Most preferably, the charging cylinder and the injection are in opposed relation to one another and are separated by a non-return valve.

In a preferred embodiment, the machine includes a sprue bushing in flow communication with the injection cylinder and a needle reciprocable within the sprue bushing for initiating and terminating flow of polymer to the internal tool.

To effect proper temperature control of the tools and the closure during formation, the internal and external mold tools include cooling channels. Heat transfer is maximized in an internal tool having cooling channels having a V-shaped configuration.

In the machine, a frame is mountable to the packaging machine, and a mandrel is mounted to the frame, on which the carton is mounted, and secured by the molding tools, during molding of the closure. Preferably, the internal mold tool is mounted to the mandrel.

A method for forming a closure on a carton blank in a tubular form, in which the carton blank is formed from a composite material having a polymer layer on at least one side thereof, includes the steps providing a fixed mold tool defining a portion of a mold cavity therein, the mold tool being in flow communication with a polymer injection system, positioning the carton blank adjacent and engaged with the internal tool, the carton blank being in an at least partially erected state having a tubular form, and providing a movable tool defining another portion of the mold cavity therein, the fixed tool mold cavity and the movable tool mold cavity defining a desired closure configuration The method further includes the steps of engaging the movable tool with the carton blank on an opposing side of the carton blank from the internal tool, pressing the movable tool to the carton blank and the fixed tool, injecting a polymer into the mold cavity to form the desired closure, and releasing the carton with the closure molded thereon.

Other features and advantages of the present invention will be apparent from the following detailed description, the accompanying drawings, and the appended claims.

BRIEF DESCRIPTION OF THE FIGURES

FIGS. 16–19 illustrate an exemplary closure formed in accordance with the present invention, in which FIG. 19 illustrates the exemplary closure formed on a carton that has been formed, filled and sealed.

DETAILED DESCRIPTION OF THE PREFERRED EMBODIMENTS

Figure 1:
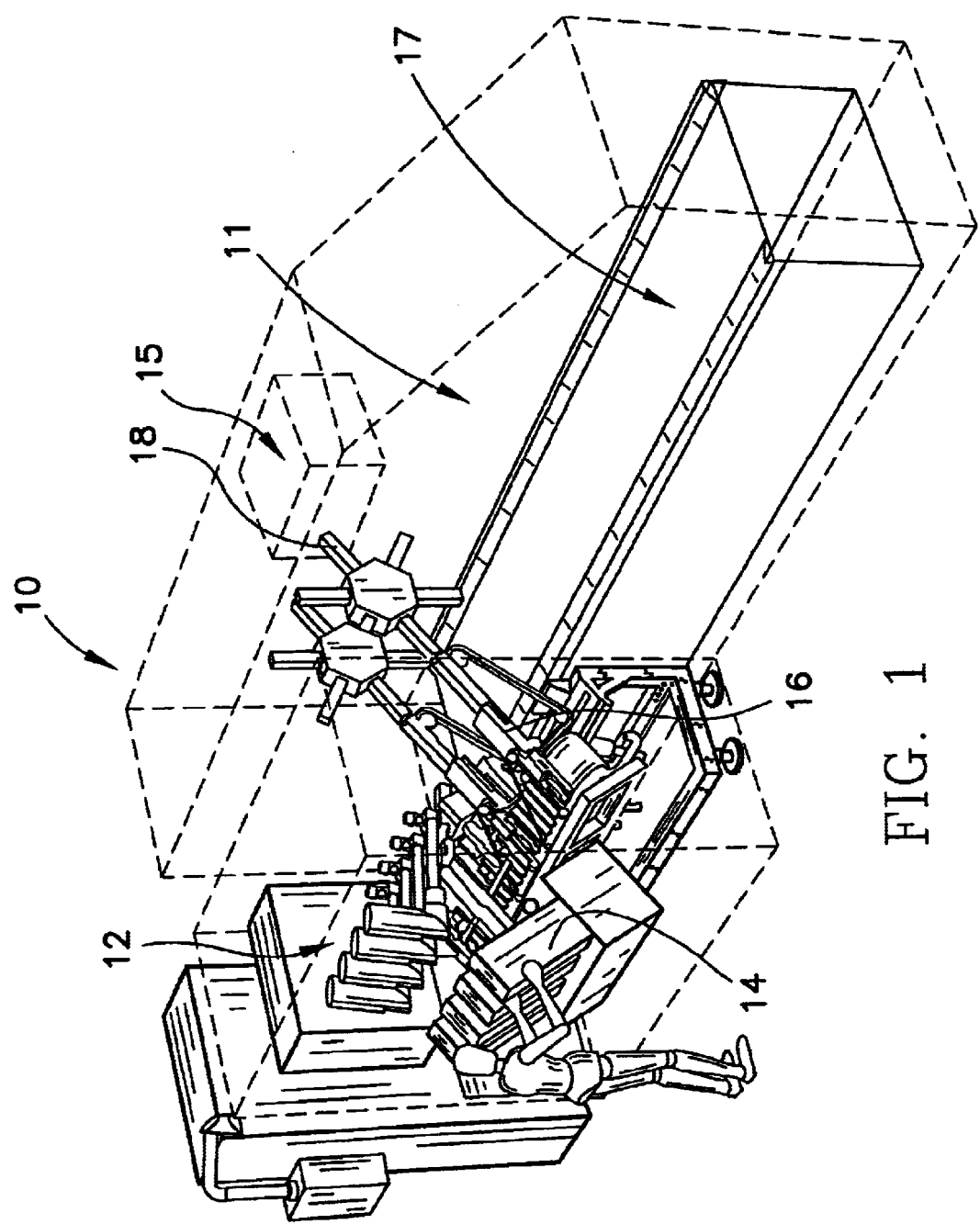
FIG. 1 is a perspective view of a form, fill and seal packaging machine having a direct injection molded closure ("DIMC") section embodying the principles of the present invention mounted thereto.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring to the figures and in particular to FIG. 1, there is shown a form, fill and seal machine 10 including a direct injection molding closure station 12 embodying the principles of the present invention. In a typical form, fill and seal machine 10, various stations are positioned along the machine 10 to effect carton erection, carton bottom panel folding and sealing, sterilization, product filling, and top panel folding and top flap sealing. One such machine is disclosed in U.S. Pat. No. 6,012,267, to Katsumata, which patent is commonly assigned herewith and is incorporated herein by reference. A filling station 11, sterilization system 15 and sealing station 17 are illustrated in FIG. 1.

The direct injection molding station 12 (hereinafter referred to as "DIMC station") is located between the carton magazine/erection station 14 and a carton loader 16. However, as will be recognized by those skilled in the art, the station 12 can be positioned at a variety of locations along the machine all of which locations are within the scope of the present invention.

Referring now to FIGS. 3 through 14; there is shown one embodiment of the molding components of the DIMC station 12 in accordance with the present invention. As set forth above, in this embodiment, the DIMC station 12 is positioned between the carton magazine/erection station 14 and the carton loader 16 which further conveys the erected cartons C toward the bottom forming mandrels 18 of the filling machine 10.

The DIMC station 12 includes a frame 20, a polymer injection system 22, a needle 24, and a sprue bushing 26. The station 12 further includes an internal tool or mold 28, a mandrel 30, a mandrel cap 32 mounted to the mandrel 30, external tools 34a,b and a press mechanism 36.

The frame 20 is provided for structure and for mounting the system components to the machine 10. The frame 20 supports the mandrel 30 which locates the top T of the carton C, a pocket or channel 38 adapted to receive and support the internal tool or mold 28, an angled passageway 40 for the sprue bushing 26 and coolant channels 42. Coolant is supplied to the mold tools 28 and 34a,b from a coolant supply (not shown).

The polymer injection system 22 is that portion of the DIMC station 12 that receives the polymer in a solid form, such as in pellet P form, liquefies the polymer and tranports it to the closure mold tools 28 and 34a,b. A contemplated polymer injection system 22, illustrated in FIGS. 4–14, includes a screw-type conveyor or extruder 50 that is positioned in a cylinder 52. Raw polymer P is fed into a hopper 54 at an upstream end of the screw cylinder 52. The screw 50 rotates and heating elements 56 positioned around the cylinder 52 elevate the temperature of the polymer. In a preferred embodiment, the heating elements 56 are electrically powered.

The torsional forces applied by the screw 50 and the energy transferred by the heating elements 56 liquefy the polymer. At an outlet end 58 of the screw cylinder 52, the now liquefied polymer flows through a transfer conduit 57, a non-return valve, preferably a check valve 59, and into a charging cylinder 60 having a pressurized space 62.

The charging cylinder 60 includes a reciprocating charging piston 64. The charging cylinder 64 is in opposing relation to and in flow communication with an injection cylinder 68. A non-return valve, preferably a check. valve, 70 is positioned at the outlet of the charging cylinder 60, between the charging and injection cylinders 60, 68. The check valve 70 permits flow of polymer from the charging cylinder 60 to the injection cylinder 68, but prevents reverse flow (i.e., from the injection cylinder 68 to the charging cylinder 60).

A longitudinal axis $A_i$ of the injection cylinder 68 is oriented substantially aligned with a longitudinal axis $A_c$ of the charging cylinder 60. That is, in the exemplary injection system 22, the injection cylinder 68 and the charging cylinder 60 are in opposed or opposing relation to one another. As will be discussed below, this arrangement, in conjunction with the low operating pressure of the injection system 22, permits in-line, direct molding of the closures S onto the container material or carton C.

Figure 8:
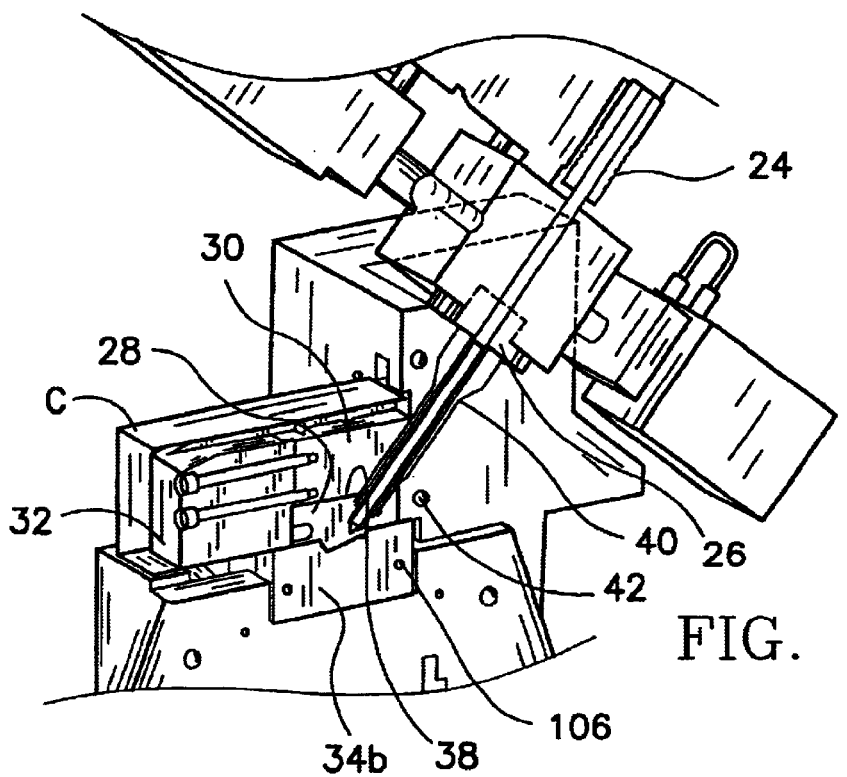
FIG. 8 is a partial cross-sectional view of the molding components shown the needle positioned within the sprue bushing and the sprue bushing positioned within the internal mold tool.
Figure 9:
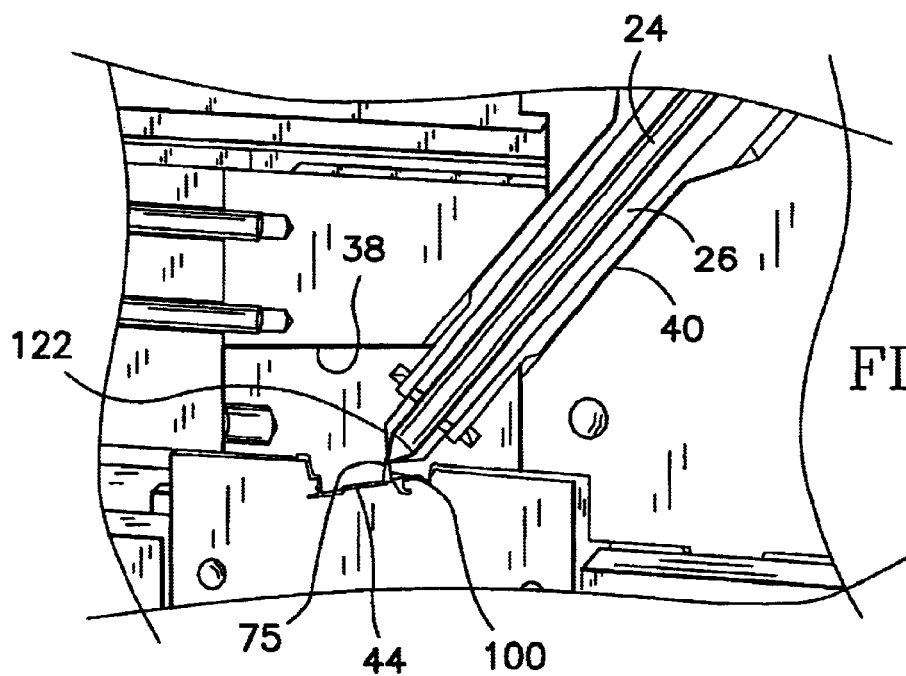
FIG. 9 is an enlarged partial cross-sectional view of the needle and sprue bushing, and internal and external tools of FIG. 8.

A compression stroke (i.e., injection stroke) of the charging piston 64, as indicated by the arrow at 72, urges the liquefied polymer into the injection cylinder 68. Likewise, a compression stroke of the injection piston 73, as indicated by the arrow at 74, urges the liquefied polymer out of the injection cylinder 68 through an injection outlet conduit 76 and through a control valve 78. Referring to FIGS. 8 and 9, in a current embodiment of the DIMC station 12, the injection outlet conduit 76 is in flow communication with and formed as part of the sprue bushing 26, and the needle 24 reciprocates or moves within the sprue bushing 26 to serve as a control valve 78.

Referring again to FIG. 14, the charging piston 64 is actuated by a secondary or driving piston/cylinder arrangement 84 that is operably connected to the charging piston 64. The injection piston 73 is also actuated by a secondary or driving piston/cylinder arrangement (an operating piston/cylinder arrangement) 86. The operating cylinder 86 includes a stop 88 to prevent over stroke of the injection piston 73. This arrangement permits precise control of the amount of liquefied polymer that is expelled from the injection cylinder 68.

As provided above, this system 22 utilizes low pressure to move or expel the liquefied polymer from the injection cylinder 68 to the mold cavity 44. Such a low pressure system provides numerous advantages over known high pressure injection systems. For example, the present low pressure system permits directly molding the closure S onto the paperboard carton C substrate by injection molding techniques. This was previously observed to be impractical with conventional high pressure injection molding systems. A low pressure injection molding system similar to the one described above is disclosed in International Appln. No. PCT/SE96/01191 (WO 97/11829), published 3 Apr. 1997. In a present embodiment, the injection pressure is about 600 bar to about 1000 bar, and preferably about 800 bar. Polymers usable for this direct molding application include any of various food-use approved materials, such as low density polyethylene (LDPE) and linear low density polyethylene (LLDPE). A preferred operating temperature for the liquefied polymer is about 200° C., and a preferred operating temperature for the mold tools 28 and 34a,b is about 25° C.

In operation of the polymer injection system 22, pellets P are fed to the hopper 54 and into the screw cylinder 52. As the screw 50 rotates and energy in the form of heat is transferred to the cylinder 52 by the heating elements 56, the polymer liquefies. The polymer exits the screw cylinder 52 and flows through the check valve 59 into the pressurized space 62 in the charging cylinder 60. The liquefied polymer is temporarily stored in the pressurized space 62 during the compression or injection stroke 74 of the injection piston 73, during which time the check valve 59 closes as a result of the increase in pressure in the injection cylinder 68. In addition, during the injection piston 73 compression stroke 74, the charging piston 64 returns to the non-compression position. This results in a lower pressure in the charging cylinder 60, which allows the check valve 59 to open and polymer to flow from the screw cylinder 52 into the charging cylinder 60.

Upon return of the injection piston 73 to the non-injection (i.e., non-compression) position, the charging piston 64 moves material from the pressurized space 62 to the injection cylinder 68. The increased pressure in the charging cylinder 60 closes the check valve 59, thus preventing reverse flow into the screw cylinder 52. As the injection piston 73 moves through the compression or injection stroke 74, the charging piston 64 returns to its non-charging (non-compression) position. In this manner, the screw 50 continuously rotates urging the liquefied polymer forward, which is temporarily stored in the pressured spaced 62 of the charging cylinder 60 during the compression (injection) stroke 74 of the injection piston 73. This arrangement reduces or eliminates dead spots, such as stagnant regions, within the injection system 22.

The present injection system 22 essentially defines three pressure regions. A first, substantially constant pressure region is defined by the screw cylinder 52 up to about the check valve 59. A second, also substantially constant pressure region, is defined by the charging cylinder 60, charging piston 64 and check valves 59 and 70. A third pressure region, which is a variable (high) pressure region is defines by the injection cylinder 68 and piston 73, the check valve 70 and the flow path through the sprue bushing 26, past the needle 24 up to and including the mold cavity 44.

Figure 10:
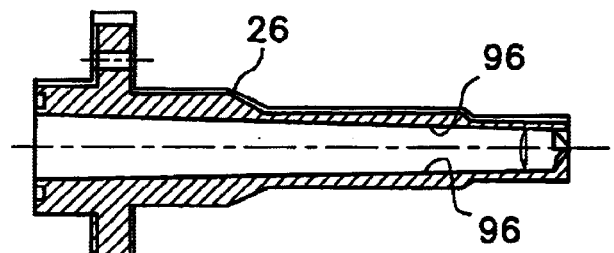
FIG. 10 is a cross-sectional view of the sprue bushing.
Figure 11:
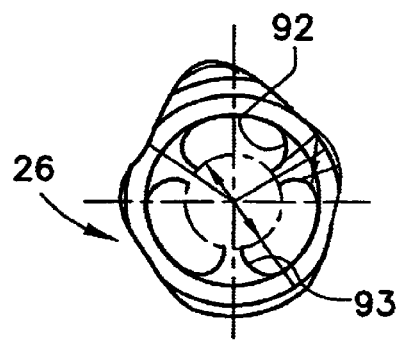
FIG. 11 is an internal view of the sprue bushing.
Figure 12:
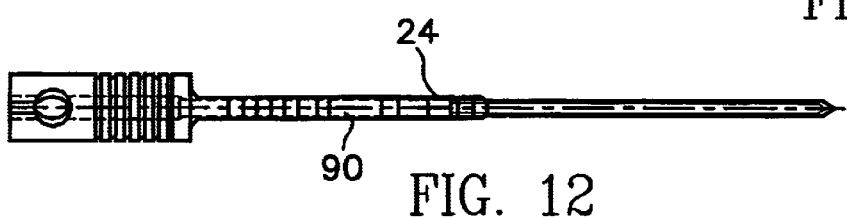
FIG. 12 is a side view of the needle.

The needle 24 is positioned within the sprue bushing 26 and serves to control the flow of polymer into the mold cavity 44. The needle 24 reciprocates within the sprue bushing 26 and rises off of a seat 75 on the internal mold tool 28. The needle 24 includes an internal heater 90 to control the polymer temperature and maintain the polymer in a flowable state as it is injected into the mold cavity 44. As provided above, the sprue bushing 26 provides a flow conduit from the injection cylinder 68 to the mold cavity 44. Referring to FIGS. 10 and 11, the sprue bushing 26 is formed having a lobed internal passageway 92. The lobes define centering spines the maintain the needle 24 centered in the sprue bushing 26. In a present embodiment, the lobed passageway 92 and spines 93 are formed at about the terminal end of the sprue bushing 26. This arrangement also provides increased control of the flow of polymer to the mold cavity 44. In a current embodiment, the sprue bushing 26 has a three-lobed passageway 92. Other configurations of the internal passageway are within the scope of the present invention.

Figure 13A:
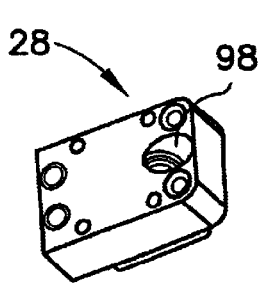
FIGS. 13a–d are illustrations of the internal mold tool showing the sprue bushing receiving opening and cooling channels formed therein.
Figure 13B:
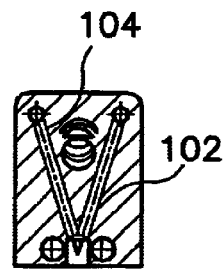
Figure 13C:
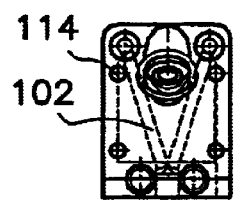
Figure 13D:
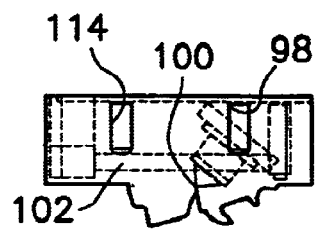
Figure 14:
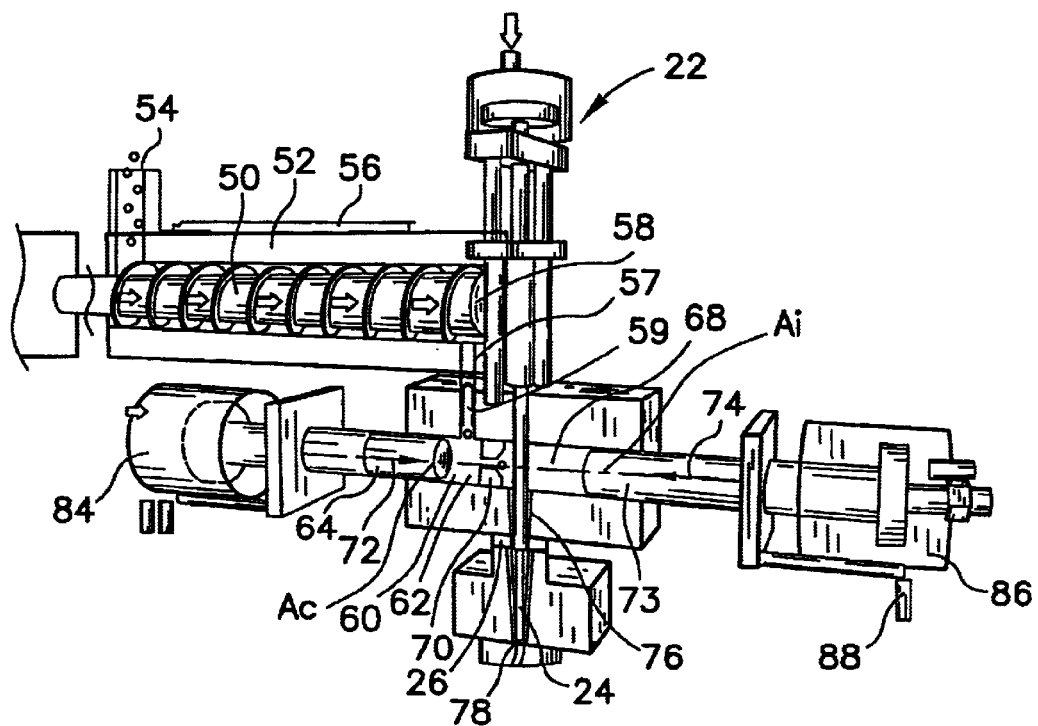
FIG. 14 illustrates one embodiment of a polymer injection system for use with the DIMC station.

The internal and external tools 28 and 34a,b form the inner and outer (relative to the carton) surfaces of the mold cavity 44. The internal or male tool 28 is stationary, as is the sprue bushing 26, and is provided with a sealed connection to the sprue bushing 26. The internal tool 28 is rigidly mounted to the mandrel 30 by a plurality of fasteners 94, such as the illustrated threaded bolts. As can be seen from FIG. 10, the sprue bushing 26 includes, in addition to the lobed passageway 92, inwardly tapered surfaces, as indicated at 96, that provide an aligning path for the needle 24. The internal tool 28 further includes a bore 98 for receiving the sprue bushing 26 and a gate 100 through which the liquefied polymer flows into the cavity 44. Coolant channels 102 are formed in the internal tool 28 to cool the tool and the polymer after the polymer is injected into the cavity 44 to form the closures S. In a current embodiment, as seen in FIGS. 13b,c the coolant channels 102 in the internal tool 28 are formed to define a V-shaped flow channel or flow path 104. This configuration provides a high heat transfer rate and a large heat transfer area to provide for increased heat transfer in the relatively small and limited area.

A pair of external or female tools 34a,b are used to compress the carton C against the internal tool 28. The external tools 34a,b are mounted to the press mechanism 36 to provide this compression. The press mechanism 36 provides for two-directional movement of the external tools 34a,b. One direction of movement is toward and way from the internal tool 28. The other direction of movement moves the external tool halves 34a and 34b toward and away from one another. When the external tools 34a,b are pressed against one another and pressed against the internal tool 28, the tools 28 and 34a,b form the mold cavity 44 into which the polymer is injected. In a present embodiment of the DIMC station 12, the press 36 applies a pressure of about 5000 pounds to about 7000 pounds between the internal and external tools 28 and 34a,b. As will be recognized by those skilled in the art, this is considerably less than the pressure needed in known injection molding systems which can be as high as 10 to 15 tons.

The two-directional movement is provided so that the external tools 34a,b can be withdrawn or moved away from the molded closure S (the first direction away from the carton C), and so that the closure can release from the mold tools 28 and 34a,b. The two sections 34a and 34b of the two-piece external tool separate from one another for ready release of the closure S after molding, without damage to the molded part.

Like the internal tool 28, the external tools 34a,b include cooling channels 106 for providing coolant to the tools 34a,b during and after polymer injection. The external tools 34a,b also include mounting holes 110 for mounting the tools 34a,b to the press mechanism 36. The mounting and movement of the external tools 34a,b relative to one another and relative to the internal tool 28 are more fully discussed in International Application Nos. PCT/SE97/01594 (WO98/18608) and PCT/SE97/01596 (WO98/18609).

The internal tool 28 is mounted to the mandrel 30. The mandrel 30 is the support member onto which the carton C is inserted during closure S formation. The mandrel 30 is rigidly mounted to, or formed as a part of the frame 20 and supports the internal tool 28 against hydrostatic forces induced by the injection of the polymer. The internal and external tools 28 and 34a,b include mounting holes 110, 112 and aligning openings 114 that are used to properly mount the tools 28 and 34a,b to their respective supporting members and to properly align the tools 28 and 34a,b relative to each other.

During set up of the machine 10, the external tools 34a,b are mounted to the press mechanism 36 by, for example, threaded bolts 116 or the like. The external tools 34a,b are positioned in the "closed" state, which is that state in which the tools 28 and 34a,b are ready for polymer injection. With the internal tool 28 set on the external tools 34a,b, the aligning pins 118 are inserted through the internal tool openings 114 and into the external tools 34a,b. In this manner, the tools 28 and 34a,b are set or aligned for proper closure S molding.

The frame 20 portion is positioned in the machine 10 frame until the internal tool 28 is aligned with the channel or pocket 38 formed in the mandrel cap 32 for receiving the tool 28. The internal tool 28 is then fastened to the mandrel cap 32 by, for example, threaded bolts 120 and the frame 20 is fastened to the machine 10 frame. The aligning pins 118 are then removed to permit freely moving the external tools 34a,b.

As can be seen from FIGS. 8–9, in the present DIMC station 12, polymer is injected into the mold cavity 44 from internally of the carton C. That is, when the carton C is positioned with the appropriate top T panel between the internal and external tools 28 and 34a,b, and the press mechanism 36 is closed, the interface of the sprue bushing 26 and the internal tool gate 100 is at a position that is internal to the carton C. this is made possible by the horizontal orientation of the carton C. In this manner, the polymer flow path is from the internal portions of the closure S to the external portions of the closure S. Essentially, molding takes place from an internal region of the erected carton.

This arrangement provides a number of benefits, one such benefit being that any gate vestige or extraneous polymer that remains from the molding operation (generally that portion of the polymer where the polymer is introduced into the mold cavity) is not visible to the consumer, but is instead internal to the container. This enhances the overall appearance of the package because this vestige is typically not an aesthetically designed piece, but rather is a remnant of the molding process. Thus, forming this gate vestige at an internal portion of the closure locates it in an area not normally viewed by a consumer.

A further benefit of this arrangement is that the sprue bushing 26 mates with the stationary internal tool 28. Thus, those portions of the system 22 that deliver the polymer to the mold cavity 44 are stationary. This eliminates the need to move the internal tool 28 (and the polymer delivery portions of the system 22), thus reducing the opportunity for misalignment of the tools 28 and 34a,b.

As will be recognized by those skilled in the art from a study of the figures and the present description, polymer flows in a straight line, between the charging and injection cylinders 60, 68, and after expulsion from the injection cylinder 68 to the gate 100 and into the mold cavity 44 (i.e., through the sprue bushing 26 and gate 100 and into the internal tool 28). This straight-line arrangement eliminated dead spots in the injection system 22, resulting in less degradation of polymer.

In addition, the mandrel 30 and mandrel cap 32 are configured to fit tightly inside of the carton C to guide and accurately locate the precise injection location (on the carton top panel or flap) with respect to the molding tools 28 and 34a,b. This arrangement assures accurately locating (±0.5 mm) the carton C between the molds 28 and 34a,b, which makes it possible to encapsulate any uncoated edge of the packaging material that may be present at, for example, an opening.

As will be recognized by those skilled in the art, in conventional closure application techniques, the carton C is provided with a pre-punched or pre-formed opening into which the closure is fitted and subsequently sealed to the carton. The edges around the this area are uncoated in that the opening is formed after manufacture of the composite or laminate structure of the carton material.

Although it is anticipated that cartons with such pre-formed openings will be used with the DIMC station 12, it is also anticipated that non-pre-formed material may also be used and that the opening can be formed as part of or integrated with the direct injection molding process. To this end, the present process molds a closure S directly onto the carton C while encapsulating the uncoated opening edges E of the carton C. This results in an improved appearance of the carton C and increased hygiene as a result of the encapsulated, unexposed, uncoated edge E. Accurately locating the carton C on the mandrel 30 also greatly reduces or eliminates any potential damage to the tooling 28 and 34a,b from the packaging material.

The present configuration using alignment pins 118 to align the tools 28 and 34a,b permits the use of very small tolerances in the internal and external tools 28 and 34a,b. In addition, because the alignment pins 118 are placed and removed when the tools 28 and 34a,b are stationary and only after they are positioned relative to one another, precise alignment of the tools 28 and 34a,b is simplified. This improves closure S quality and molding location accuracy, and further prevents damage to the tools 28 and 34a,b during operation.

The sealing connection between the sprue bushing 26 and the internal tool 28 is on cylindrical surfaces, as indicated at 122, with axial clearance for the end of the sprue bushing 26. To this end, molten polymer is container and thermal expansion of the sprue bushing 26 is accommodated without stressing the internal tool 28.

The present station uses an arrangement of compact cooling channels 102 and 106 which, along with the alignment holes 114 in the internal tool 28, minimizes the size of the internal tool 28. Minimizing the size of the internal tool 28 maximizes the moment of inertia of the mandrel 30 cross-section and thus increases its stiffness. The stiffness of the mandrel 30 is critical to control the thickness of thin sections of the closure S which, as will be recognized by those skilled in the art, are critical to the function of the closure S. For example, (as will be described below) if the closure is molded with a membrane or like frangible member, the thickness (or thinness) of the frangible member must be tightly controlled to assure that the break occurs at a precise, predetermined location. The same may also be true for other portions of the closure including other tamper-evidence features.

As set forth above, the internal tool 28 includes a V-shaped cooling channel 102. This maximizes heat removal from the internal tool 28, resulting in shorter cycle times, further supporting the high throughput of molded closures S necessary to meet the high speed operation of present form, fill and seal packaging machines.

Figure 2:
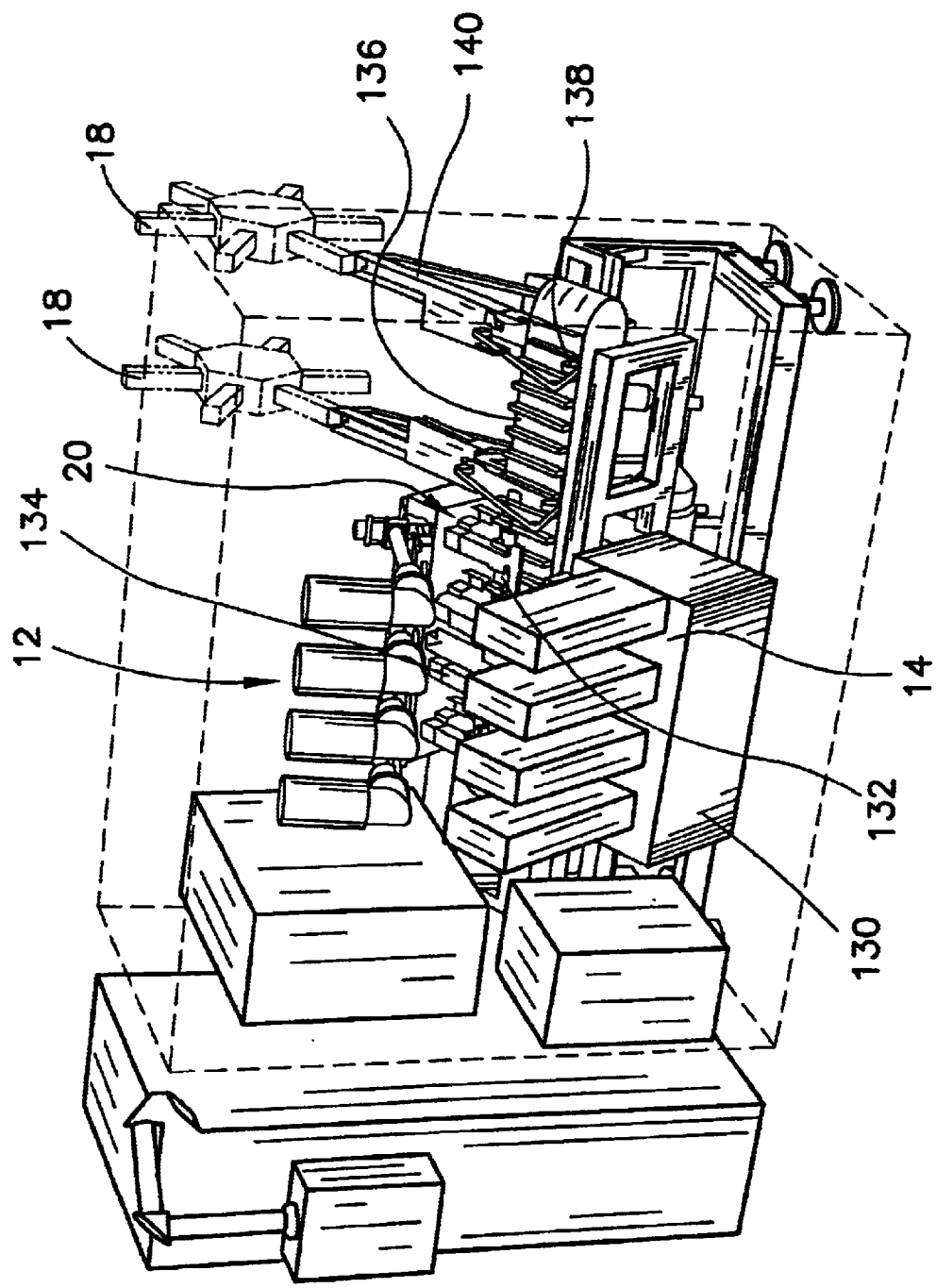
FIG. 2 is an enlarged, partial perspective view of the machine of FIG. 1 illustrating the position of the DIMC section relative to the other portions of the machine.
Figure 3:
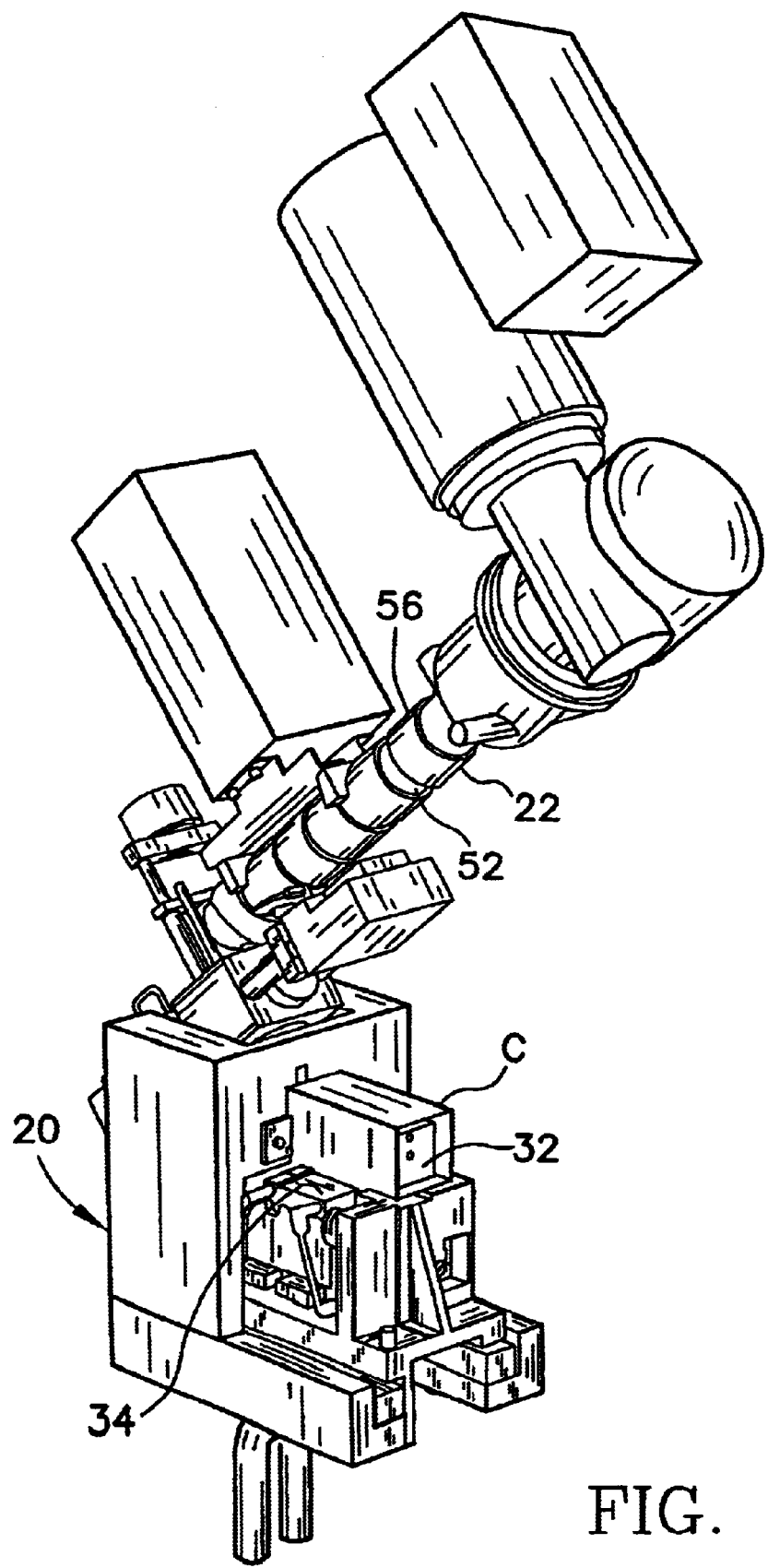
FIG. 3 is a perspective view of the molding components of the DIMC station, the molding components being shown with an exemplary carton positioned for having a closure molded thereon.
Figure 4:
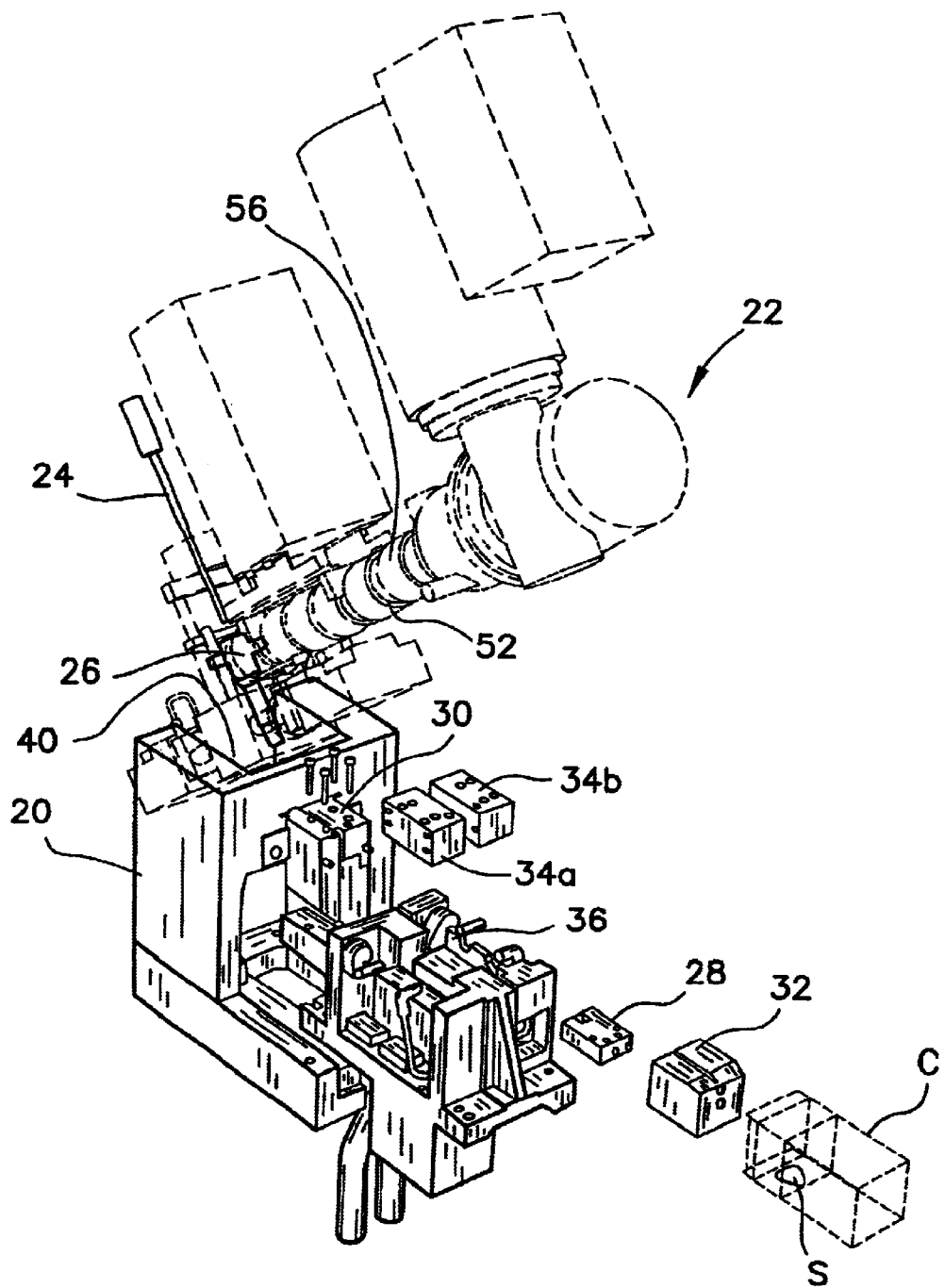
FIG. 4 is an exploded view of the molding components shown in FIG. 4.
Figure 5:
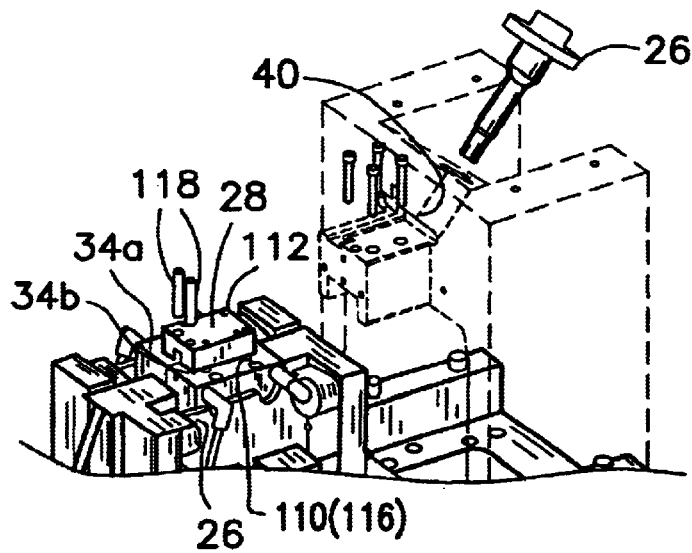
FIGS. 5 through 7 are partial exploded views of the molding components of FIGS. 3 and 4.
Figure 6:
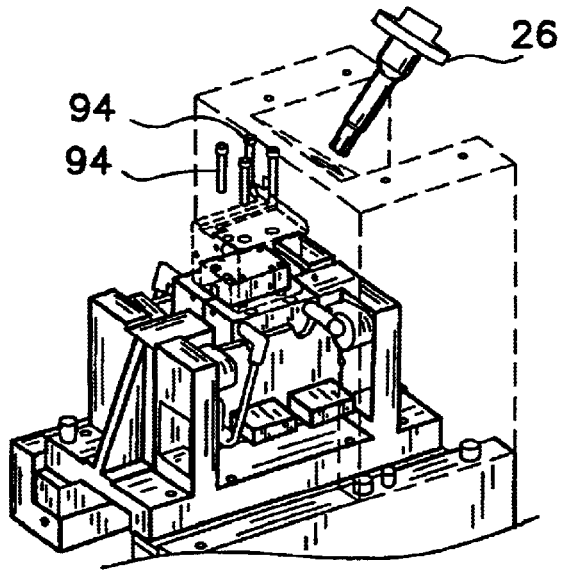
Figure 7:
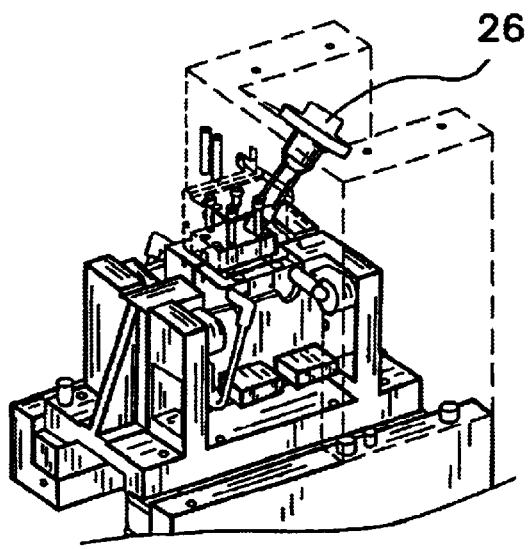

In one contemplated method, a carton C blank is fed from the carton magazine 14. The carton C, in this form, has the side seal formed, and the top and bottom panels are unsealed and folded flat. The carton C is picked from the magazine 14 and is erected into a tubular form (as shown in FIG. 3 loaded onto the mandrel 30). Referring to FIGS. 1 and 2, the tubular form carton C is placed on a conveyor loader 130 and transferred to a conveyor 132. The conveyor 132 moves the carton C to the DIMC station 12. A molder loader 134 transfers the cartons C from the conveyor 132 to the station 12. The tubular cartons C, which are oriented horizontally on the DIMC station 12 (i.e., lying on a side) are positioned on the mandrels 30. The press mechanism 36 closes the external tools 34a and b to one another and to the internal tool 28 and provides the necessary load or pressure to maintain the mold closed during polymer injection.

The injection system 22, which is substantially constantly in operation, is then actuated by a compression stroke 74 of the injection piston 73, and liquefied polymer is expelled from the injection cylinder 68, through the sprue bushing 26 and past the needle 24. This forces the needle 24 to rise off of the seat 75 of the internal tool 28 and liquefied polymer fills the mold cavity 44. The edges E of the opening O in the carton C are encapsulated as the liquefied polymer fills the mold cavity 44. This also bonds the liquefied polymer to the polymeric coating of the packaging material.

Coolant flowing through the cooling channels 102 and 106 cools the closure S and maintains the tools 28 and 34a,b within a predetermined temperature range. The press mechanism 36 then opens, separating the external tools 34a and 34b and drawing them away from the internal tool 28. The finished closure S is then released from the mold. The carton C, with the closure S molded thereon is removed from the mandrel 30 and placed in a conveyor 136. The conveyor 136 carries the cartons and places them in shuttles 138. The shuttles 138 feed the cartons C to mandrel loaders 140 for bottom panel folding and sealing. This portion of the process (the placement on the bottom forming mandrels, bottom panel folding and sealing) is well-known in the art Subsequent to bottom panel sealing, the cartons C are moved through the remainder of the form, fill and seal machine 10.

Figure 15:
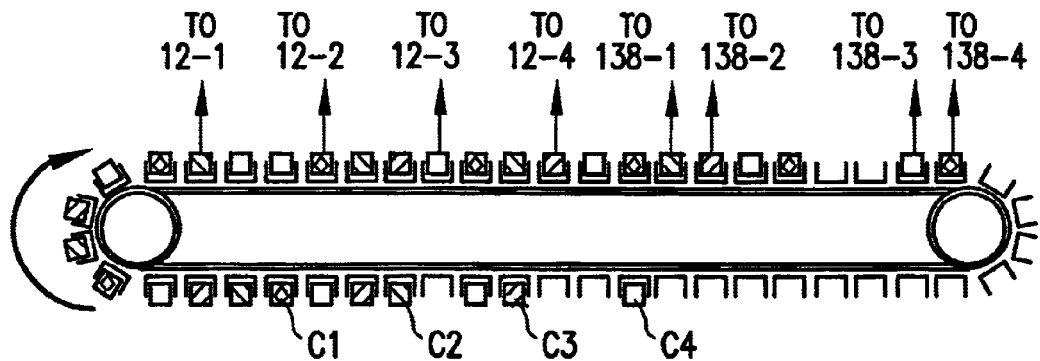
FIG. 15 illustrates one mode of operation of the DIMC station in which multiple closures are molded onto respective cartons in a single cycle of operation.

FIG. 15 illustrates one arrangement in which the DIMC station 12 is operated to form closures S on four cartons C in a single cycle of operation. In this arrangement, cartons C1–C4 are loaded from respective magazines 14 onto the conveyor 132. The conveyor 132 transports that cartons C1–C4 to one of four DIMC stations 12-1 through 12-4. The closures S are molded onto the cartons C1–C4 and the cartons are conveyed to the shuttles 138-1 through 138-4 for further processing as described above.

One contemplated closure S formed in accordance with the present process is illustrated in FIGS. 16–19. As can be seen from the figures, the closure S includes a bottom flange portion 176 and an upstanding spout 178. A cap portion 180 of the closure S is formed integral with and separable from the flange 176. In this closure S, a projection 182 extends rearwardly from the cap 180 and is configured to engage a post 184 that extends upwardly from a rear of the flange 176. Preferably, the rearward projection 182 includes a hook-like end 186 that engages the post 184 to secure the cap 180 in the open position. The post 184 can extend upwardly and rearwardly to provide greater "positive" engagement by the projection 182.

Figure 18:
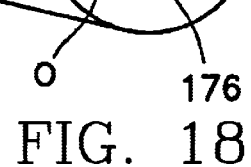

As can be seen from FIG. 18, the flange portion 176 surrounds or encapsulates the material at the edge E of the opening O in which the closure S is formed. Advantageously, this provides a high integrity, high confidence seal between the closure S and the carton C. In addition, because the edges E of the opening O are uncoated, encapsulating these edges E reduces or eliminates the opportunity for liquids to seep or wick into the carton material. It is desirable to reduce seepage or wicking in that this further increases the integrity of the carton/closure combination as it effects product quality. It is anticipated that this encapsulating arrangement will also enhance the shelf-life of the product, again, by increasing product quality and reducing the opportunity for compromising the integrity of the carton and/or contaminating the product.

Figure 19:
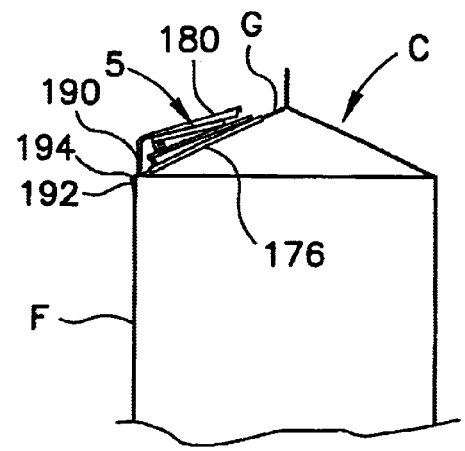
Figure 16:
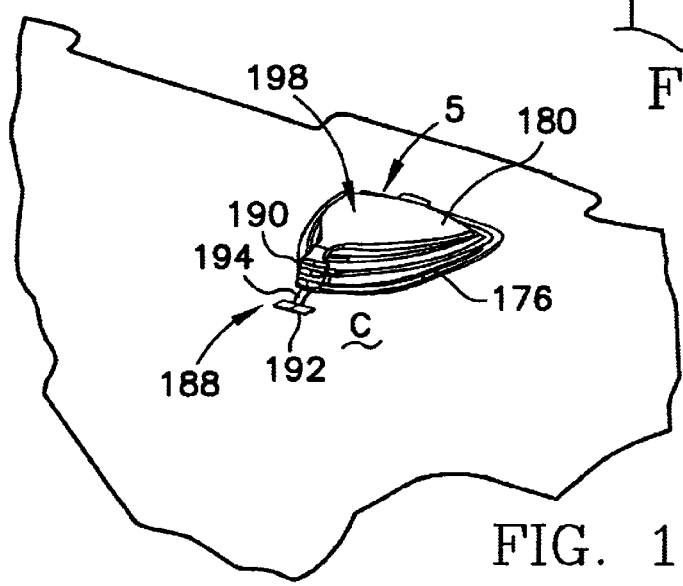
Figure 17:
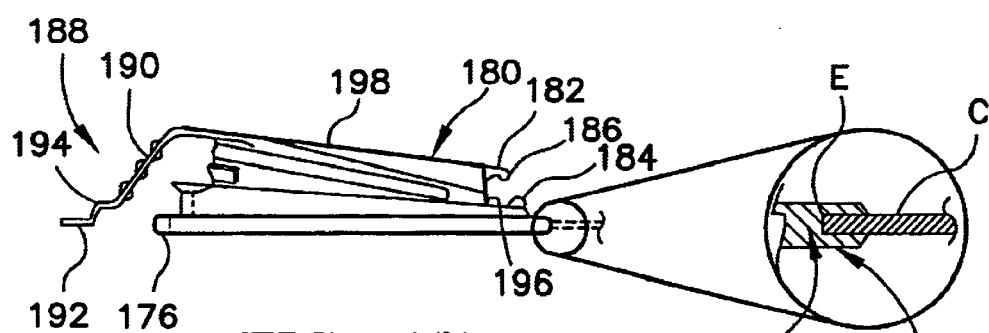

The closure S further includes a tamper evident portion, indicated generally at 188, which, when removed, or displaced, indicates to the consumer that the package seal may have been broken. In a present configuration, the tamper-evident portion 188 includes a tab 190 that is formed integral with the cap 180 and extends to the carton C material. Preferably, as seen in FIG. 19, an end 192 of the tab 190 is also molded to the carton C, and most preferably, is molded to the carton C spaced from the flange 176. In this manner, in order to access the contents of the carton C (i.e., open the cap 180), it is necessary to pull or remove that portion 192 of the tab 190 that is molded to the carton C. The tab 190 can be formed so that the end 192 separates from the carton C. Alternately and preferably, the tab 190 can be configured having a frangible portion 194 located between the tab end 192 and the cap 180 so that the tab 190 is broken at the frangible region 194 to open the cap 180 and access the contents of the carton C. As can be seen in the carton C illustrated in FIG. 19, the tab 190 spans from the gable portion G of the carton C to a front wall F and is under tension in this state. This provides further tamper evidence or indication.

The cap 180 is configured to pivot about an elongated hinge 196 to reduce the stresses associated with opening and closing the cap 180. The cap 180 can also include a relatively flat top region, as indicated at 198 to, for example, include indicia (not shown), indicating the packaging manufacturer, dairy, bottler or the like.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A form, fill and seal packaging machine for forming, filling and sealing a carton, the machine configured to mold a closure directly onto the carton, the machine comprising:

a carton erection station, the carton erection station adapted to receive a carton in a generally flat form and erect the flat form carton into a tubular form defining an internal carton region;

a direct injection molding station having a mold tool having an internal mold tool and an external mold tool, the internal mold tool configured for receipt within the internal carton region, the internal mold tool and the external mold tool configured to receive and clamp the carton therebetween, the direct injection molding station further including a polymer injection system for injecting polymer from a location external of the carton to the mold tool, wherein a closure is directly molded in place on the carton, wherein the external tool is configured to move between a first position in which the external mold tool is disengaged from the internal mold tool and a second position in which the external mold tool is engaged with the internal mold tool with the carton disposed therebetween, the external mold tool being formed having first and second portions configured to move toward one another when the external mold tool moves to the second position, and away from one another when the external mold tool moves to the first position;

a filling station for filling the carton; and a sealing station for forming a seal on the carton.

2. The form, fill and seal packaging machine in accordance with claim 1, wherein the internal mold tool includes cooling channels.

3. The form, fill and seal packaging machine in accordance with claim 2, wherein the cooling channels are formed having a V-shaped configuration.

4. The form, fill and seal packaging machine in accordance with claim 1, wherein the direct injection molding station includes a frame mountable to the packaging machine, and wherein the frame includes a mandrel on which the carton is mounted during molding of the closure.

5. The form, fill and seal packaging machine in accordance with claim 4, wherein the internal mold tool is mounted to the mandrel.

6. A direct injection molding station for use on a form, fill and seal packaging machine for forming, filling and sealing a carton, the molding station being configured to mold a closure on a predetermined portion of the carton, the molding station comprising:

a frame;

a mold tool set including a first mold tool and a second mold tool, the first mold tool carried by the frame and having cooling channels formed therein in flow communication with channels formed in the frame for supplying a coolant to the cooling channels, the second mold tool carried by the frame, the second mold tool being movable between a first position wherein the second mold tool is disengaged from the first mold tool and a second position in which the second mold tool is engaged with the first mold tool with the carton disposed therebetween, the second mold tool being formed having first and second portions configured to move toward one another when the second mold tool moves to the second position, and away from one another when the second mold tool moves to the first postion;

a polymer injection system including a polymer flow conduit for providing polymer from a location external of the carton to the mold tool set, wherein a closure is directly molded at the predetermined portion of the carton.

7. The direct injection molding station in accordance with claim 6, wherein the cooling channels in the first mold tool are formed having a V-shaped path.

* * * * *